(12) United States Patent
Hellegouarch et al.

(10) Patent No.: US 10,836,500 B2
(45) Date of Patent: Nov. 17, 2020

(54) ASSEMBLY BETWEEN AN AIRCRAFT PYLON AND A TURBINE ENGINE

(71) Applicant: Safran Aircraft Engines, Paris (FR)

(72) Inventors: Antoine Elie Hellegouarch, Moissy-Cramayel (FR); Marc Patrick Tesniere, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 355 days.

(21) Appl. No.: 15/794,255

(22) Filed: Oct. 26, 2017

(65) Prior Publication Data

US 2018/0118358 A1  May 3, 2018

(30) Foreign Application Priority Data

Oct. 28, 2016 (FR) ...................................... 16 60551

(51) Int. Cl.
*B64D 27/26* (2006.01)
*F01D 25/28* (2006.01)

(52) U.S. Cl.
CPC ............ *B64D 27/26* (2013.01); *F01D 25/28* (2013.01); *B64D 2027/266* (2013.01); *B64D 2027/268* (2013.01); *F05D 2220/323* (2013.01); *F05D 2240/90* (2013.01)

(58) Field of Classification Search
CPC .............. B64D 27/26; B64D 2027/266; B64D 2027/268; B64D 2027/262; F01D 25/28; F05D 2220/323; F05D 2240/90
USPC ......................................................... 244/54
See application file for complete search history.

(56) References Cited

U.S. PATENT DOCUMENTS

| 3,042,349 A | 7/1962 | Pirtle et al. |
| 8,740,136 B2 * | 6/2014 | Audart-Noel .......... B64D 27/26 244/54 |
| 2012/0080554 A1 | 4/2012 | Lafont et al. |
| 2013/0200211 A1 | 8/2013 | Zheng et al. |

FOREIGN PATENT DOCUMENTS

| EP | 1 090 838 A1 | 4/2001 |
| FR | 2 965 796 A1 | 4/2012 |
| GB | 743205 | 1/1956 |
| WO | WO 85/02596 A1 | 6/1985 |

* cited by examiner

*Primary Examiner* — Christopher P Ellis
(74) *Attorney, Agent, or Firm* — Blank Rome LLP

(57) ABSTRACT

An assembly between an aircraft structural pylon and an aircraft turbine engine is disclosed, with the assembly comprising a beam intended to be attached to the turbine engine and wherein a knuckle intended for the installation of a pad integral with the pylon is mounted, with the beam comprising suspension lugs each including a bore for the passage of a shaft intended to further go through a bore formed in the pylon to connect the beam with the pylon.

16 Claims, 2 Drawing Sheets

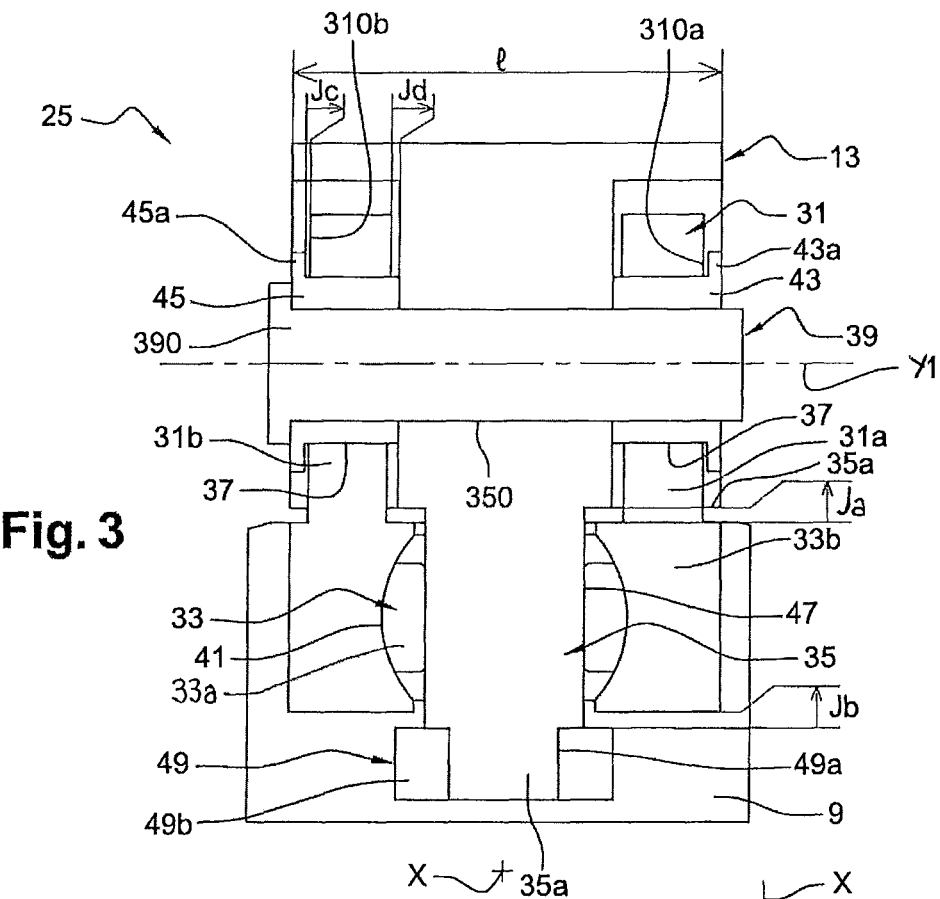
Fig. 3
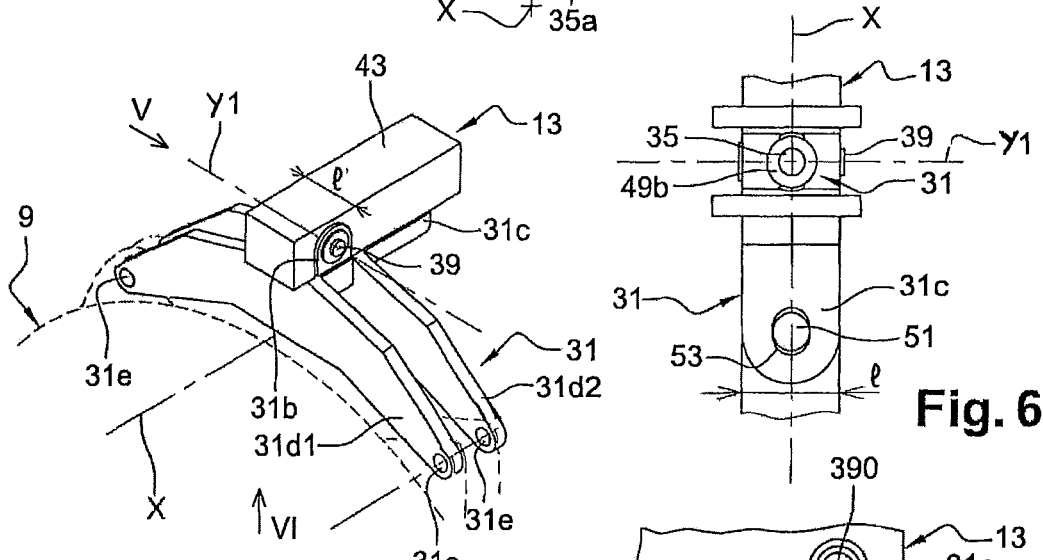
Fig. 4
Fig. 6
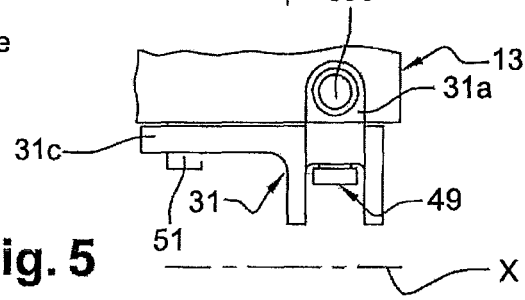
Fig. 5

ASSEMBLY BETWEEN AN AIRCRAFT PYLON AND A TURBINE ENGINE

CROSS-REFERENCE TO RELATED APPLICATIONS

This application claims the benefit of French Patent Application 1660551, filed Oct. 28, 2016, the contents of which is incorporated herein by reference.

FIELD OF THE INVENTION

The present invention relates to an assembly between a structural pylon (also called a mast) of an aircraft and an aircraft turbine machine, and more specifically concerned with a situation where a turbine engine, such as an aircraft turbojet engine or turboprop engine, has to be hooked (or suspended) under an aircraft wing, using a pylon.

BACKGROUND

A turbine engine is generally suspended to at least one such pylon through a yoke which is attached to the turbine engine body by means of attachments, typically at the intermediate casing thereof. Such yoke comprises yoke joints whereon stress transferring parts additionally connected to means for suspending the turbine engine to the pylon are mounted.

As a matter of fact, a solution is already known in the technical field, from what is disclosed in FR 2 965 796, wherein the suspended assembly comprises:
  a beam with a bracket provided with attachment means for attaching to said pylon, and
  a suspension hoop connected to the beam through at least one pin joint, the axis of which is intended to be parallel to the axis (X) of the engine, with the suspension hoop comprising means for attachment to a casing of the turbine engine, at each one of its ends.

It should be noted in this description that:
  «radial(ly)» (globally) means radial(ly) relative to the mounting/dismounting axis (Y1) of said «through shaft». Typically, at least in the case of a suspension of a turbine engine by a pylon under the wing of an aircraft, such shaft will be transversal to the axis (X) of revolution of the turbine engine, which is the axis along which the flow of fluid to be circulated therein generally flows, towards the downstream direction, and
  «axial(ly)» (globally) means along or parallel to the above-mentioned axis Y1.

Within the scope of the present application, it is desired:
  to provide a safe connection between the pylon and the turbine engine attachments,
  to position the turbine engine as close as possible to the pylon,
  to provide an easily reachable connection,
  to enable an easy mounting between the pylon and the turbine engine attachments, by vertically lifting the turbine engine,
  to enable integrated clearances, required for the correct operation of the assembly and the mechanical aspect thereof,
  to provide an efficient transfer of the thrust of the operating turbine engine
  to provide a fail-safe mounting,
  to provide an isostatic mounting of the assembly,
  to avoid, like it happens in a conventional solution with two hooking means, respectively a front hooking and a rear hooking, at least one of such hooking means being provided with two knuckles,
  to enable using narrower pylons than in many other solutions.

Solutions aiming at reducing the width of the beam, and more particularly the beam body, have already been proposed. Document FR 2 965 796A1 discloses such an issue, and provides for a suspension hoop articulated on the beam body, along an axis parallel to the axis of the turbine engine. However, this is not the optimal solution if it is desired to position the turbine engine closer to the pylon.

SUMMARY

In order to provide a solution able to overcome at least a part of the above-mentioned and listed problems, the invention proposes a suspended set of an aircraft, comprising:
  an aircraft structural pylon of which a pad is integral with and in which is located a first bore,
  a turbine engine, and,
  an assembly between the aircraft structural pylon and the aircraft turbine engine, with the assembly comprising a beam attached to the turbine engine and wherein a knuckle for receiving the pad is mounted, with the beam comprising suspension lugs each including a second bore for the passage of a shaft which further passes through the first bore to connect the beam with the aircraft structural pylon.

To provide an efficient mechanical resistance to the thrust of the turbine engine, it is proposed that the suspended set be so that:
  the pad extend along an axis (X) along which globally flows from upstream to downstream a flow of fluid to be circulated therein, and,
  the first bore through which passes the shaft be transverse to said axis (X).

To also focus on the mechanical resistance and facilitate manufacturing together with transfer of efforts, it is proposed that, in the suspended set, the suspension lugs be integral with the beam and extend on both sides of the aircraft structural pylon.

In order to make up for the possible axial misalignments of the suspension lugs or yokes and the pylon, it is proposed that the knuckle should comprise a C-clamp mounted to rotate in an external body of the knuckle integral with the beam, with said C-clamp providing a passage intended to be gone through by the pad.

In order to specifically favour the desired fail-safe mounting, it is further proposed that, (aircraft/engine) on the ground, the pad integral with the pylon should be oriented vertically, go through a lower opening of the external body of the knuckle, and should have a lower end provided with a locking head. Such locking head is intended to cooperate with said external body in case of failure of the suspension lugs and/or of the shaft, in order to provide, then, the holding in suspension of the turbine engine in a degraded mode of operation.

In order to specifically favour a fail-safe mounting, and facilitate the mounting, it is also proposed that the locking head provided on the pad (also called groin) should comprise:
  a threaded part at said lower end of the pad, and
  a nut screwed about said threaded part, with said nut being adapted to support the external body of the knuckle in the degraded mode of operation.

To facilitate the production and optimize the behaviour when exposed to stress in the concerned area, it is also proposed that the external body of the knuckle should be formed as a single piece with the suspension lugs.

In order to enable integrated clearances, required for a correct operation of the assembly and an easy mounting between the pylon and the turbine engine attachments, by vertically lifting the turbine engine, it is also proposed:

that, for the ball effect, clearance should be provided between an external body of the knuckle and either the pylon, or, towards the pylon, a shoulder provided on the pad, and/or:

that the bores of the lugs (suspension yokes) should extend along an axis, and that first and second bushes should have shoulders and should respectively be mounted in the respective bores of the lugs, about said through shaft and should have an axial clearance relative to outer surfaces of the first and second lugs opposite which said shoulders are then respectively positioned.

And, in order to favour a so-called efficient transfer of the thrust of the operating turbine engine, a fail-safe mounting, and an isostatic mounting of the assembly, it is further proposed that the assembly should further comprise a finger extending in a direction parallel to that of the pad and which is integral with the pylon at a distance from said pad (or even the lugs and the shaft provided to connect the beam with the pylon), with said beam then having an oblong orifice elongated in a direction passing through the finger and the pad, and wherein the finger will be adapted to be engaged with a possible clearance in such direction.

The suspended set as proposed can furthermore specifically concerning the suspension of a multi-flow turbojet engine, as the so-called turbine engine.

This applies to any turbojet engine of this type, provided:

in the front, with a fan having a fan casing, and with a gas generator accommodated inside an assembly of casing(s) and comprising, behind the turbine engine fan, compression stages, a combustion chamber area and turbine stages, Two mountings are specifically and notably concerned:

a case where the suspended set comprises a front hooking system (interposed) between the fan casing and a structure of the aircraft, and a rear hooking system (interposed) between a rear part of the assembly of casing(s) and a structural pylon of the aircraft, a case where the suspension device comprises a front hooking system (interposed) between a front part of the assembly of casing(s) and a structural pylon of the aircraft, and a rear hooking system (interposed) between a rear part of the assembly of casing(s) and said structural pylon of the aircraft.

In order to make it possible to use narrower pylons than in many other solutions, it is proposed that, in the above cases: the rear hooking system—respectively the front hooking system—comprises the aircraft structural pylon which is integral with said pad and in which is located the first bore.

In such cases, a suspension device can then be provided, wherein the pylon will have a width of less than 250 mm, or even less than 200 mm.

As the suspension device (also called hooking device) has a direct impact on the aerodynamic performances of the engine (or turbine engine) and of the aircraft, either because of the obstacle it creates in the secondary flow of the engine, or because of the overall dimensions and the position it imparts to the pylon, the latter in turn becomes an obstacle in the secondary flow of a multi-flow turbojet engine or indirectly increases the drag of the nacelle it is provided with, in that it flares.

The above mentioned solutions avoid the above, or at least limit such drawbacks.

BRIEF DESCRIPTION OF THE DRAWINGS

The invention will be better understood, if need be, and other details, characteristics and/or advantages of the invention will appear upon reading the following description given by way of a non restrictive example while referring to the appended drawings wherein:

FIG. 3 corresponds to the section of FIG. 1 or 2;

FIG. 4 is a local perspective of the mounting shown in FIG. 3; and

FIGS. 5, 6 are two views in the V and VI directions of FIG. 4.

DETAILED DESCRIPTION

Figure 1:
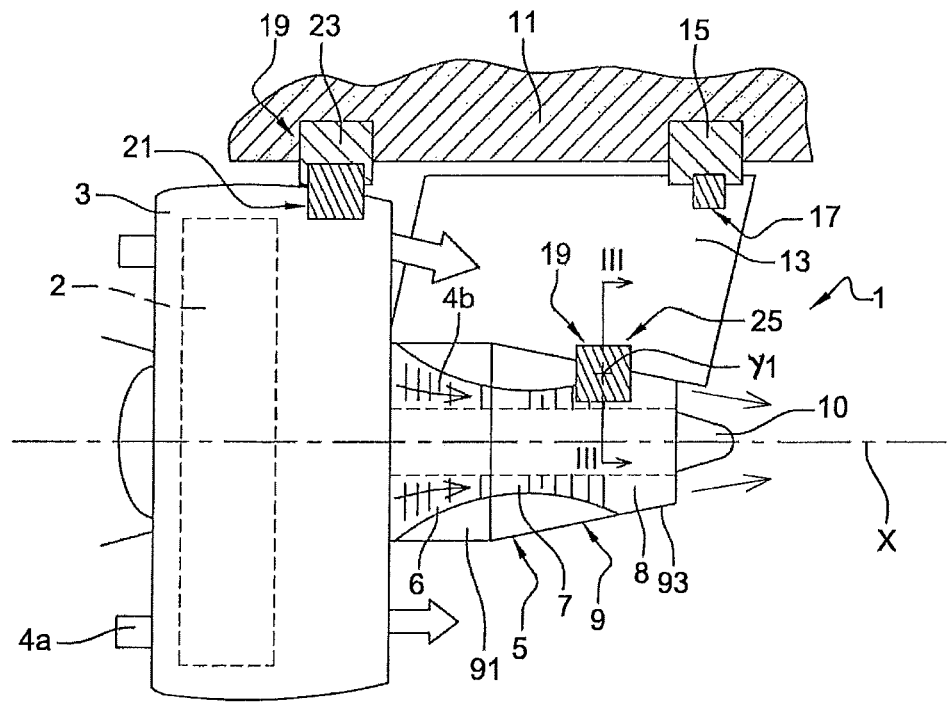
FIG. 1 is a schematic, partially lateral, partially sectional view of a partial longitudinal half-section of an avionic turbine engine mounted on an aircraft, under a wing shown in section, in the example.

The engine shown in FIG. 1 is a turbofan engine 1 with a fan 2 at the front, rotating about the axis X of the engine in the fan casing 3, for the passage of a secondary fluid flow 4a. Downstream (or further back, along the axis X), the engine part 5 called «gas generator» which produces the primary gas flow 4b is accommodated inside an assembly of casing(s) also called the primary flow casing(s) assembly 9. The gas generator 5 comprises the compression stages 6 downstream from (or at the back) of the fan, the combustion chamber 7 and the turbine stages 8 wherein the primary gas flow 4b passes. The engine part downstream from (at the rear of) the primary flow casing 9 comprises an exit cone 10 about which the burnt gas of the primary gas flow flows out.

Figure 2:
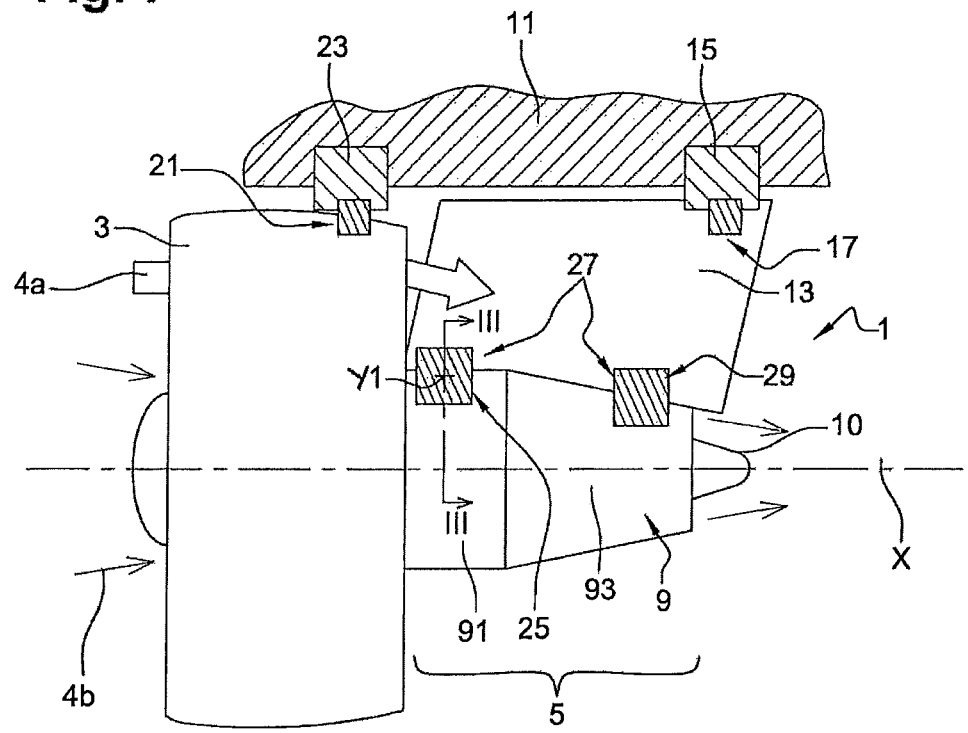
FIG. 2 is a similar view of an alternative mounting.

The engine of FIG. 2 has the same architecture.

Two modes of attaching such a turbine engine are additionally shown in FIGS. 1 and 2.

In the first case (FIG. 1), the engine is suspended or hooked under the wing 11 of an aircraft by means, at the back, of a rigid, substantially parallelepiped, and not deformable element forming the pylon 13.

Longitudinally, parallel to the axis X, the pylon 13 extends along said primary flow casing(s) assembly 9, between same and a rear spar 15 of the wing 11.

At the back, the pylon 13 is attached to the rear spar 15, by means of conventional attachments 17 which may include bolts and nuts.

The engine is globally hooked by means of a suspension, generally bearing reference number 19 and comprising:

front hooking means 21 between the fan casing 3 and a structure 23 of the aircraft, which may be a front spar of the wing 11, as shown, and rear hooking means 25 between a rear part 93 of the casing(s) assembly 9 and the structural pylon 13.

Such rear part 93 of the casing(s) assembly may include a low pressure turbine casing whereon the rear hooking means 25 is attached.

The front hooking means 21 may include conventional solutions.

The other hooking means 25 comprises an assembly according to the invention which is described in details hereunder. It provides the rear suspension of the engine 1.

In the second case (FIG. 2), the pylon 13 is attached, at the back, to the rear spar 15, using conventional attachments 17.

The engine 1 is here globally hooked by means of suspensions, generally bearing reference number 27, and comprising:

the hooking means 25 again, and rear hooking means 29 between a rear part of said primary flow casing(s) assembly 9 and the same structural pylon 13 of the aircraft.

The hooking means 25, in this case, provides the front suspension of the engine 1, between a front part of the primary flow casing(s) assembly 9 and a front part of the structural pylon 13. Such front part 91 of the casing(s) assembly, located just upstream from the above-mentioned casing 93, may comprise an inner shroud of a so-called intermediate casing whereon the front hooking means 25 is attached.

Again, the front hooking means 25 will then comprise the assembly according to the invention, which is disclosed in details hereunder.

The rear hooking means 29 is conventional. This may be the one disclosed in FR 2 965 796, thus with a suspended assembly comprising (solution not shown):

a beam with a bracket provided with means for attachment to the pylon 13, and a suspension hoop connected to said beam through at least one pin joint, the axis of which is intended to be parallel to the axis X of the engine, with the suspension hoop comprising means for attachment to the primary flow casing(s) assembly 9 of the turbine engine, at each one of its ends.

The front hooking means 21 is also present, which may use conventional solutions, between the fan casing 3 and a front spar of the wing 11.

It should be noted that the fan casing 3 may be formed with several axially successive casings (along axis X), among which an upstream casing actually surrounding the fan 2, about the axis X, and an intermediate casing located in the axial extension of the fan casing.

Similarly, the primary flow casing(s) assembly 9 will typically consist of several axially successive casings (along axis X).

As regards the assembly 25 according to the invention, and thus which may define the front hooking means in the second case mentioned above, and the rear hooking means in the first case, it comprises, as schematically shown in FIGS. 3-6, a beam 31 intended to be attached to the turbine engine (here the primary flow casing(s) assembly 9, for instance by means of bolts and nuts). A knuckle 33 intended for the installation of a pad (or groin) 35 integral with the pylon 13 is mounted in such beam 31. The beam 31 may be hoop-shaped. It is provided, at the top thereof, with a «female» suspension yoke joint in which suspension lugs are preferably integral with the beam 31 and extend on both sides of the aircraft structural pylon 13.

In the preferred illustrated example, this «female» suspension yoke joint has a U-shaped section, which comprises two lugs 31a, 31b forming the two branches of the U.

Each lug includes a bore 37 for the passage of a shaft 39 further extending through a part (here the pad 35) formed in the pylon 13, or integral with such pylon, to connect the beam 31, thus the turbine engine 1 to the pylon 13, here via the primary flow casing(s) assembly 9.

In the exemplary embodiment, the pad 35 thus has a bore 350 provided to be horizontal (coaxial with the bores 37) and transversal to the axis X along which said pad 35 extends.

In operation, and transversally to the axis X, both lugs 31a, 31b are vertically raised on either side of the pad 35, which is then vertical.

The knuckle 33 comprises a C-clamp 33a mounted in a cage 41, which is formed by a partially spherical cavity provided in an external body 33b. The cage 41 is positioned under the female yoke joint formed by the two lugs 31a, 31b, and is thus integral with the beam 31. It may be integral with the female yoke joint. The lower part thereof is provided with an opening, through which the knuckle 33 is introduced when being installed. Such opening enables a lower end 35a of the pad 35 to protrude out of the cage 41 for installing a fail-safe system, as explained hereunder.

As can be seen in FIG. 4, the beam 31 comprises at least one transversal hoop-shaped arm, for instance two transversal arms 31d1, 31d2, to be rigidly attached, at the ends 31e thereof, on either side of one arm, to a part such as a «male» yoke joint inserted between two ends 31e and mounted on the primary flow casing(s) assembly 9.

Notably to enable making up for the possible axial misalignment between the axis of the suspension lugs 31a, 31b and the axis of the bore 350 provided in the pylon 13, the respective bores 37 of such lugs are provided with preferably eccentric first and second bushes 43, 45 which are respectively tight fitted thereon, about the through shaft 39.

To position the mounting disclosed above, the turbine engine whereon the beam 31 is attached just needs to be vertically lifted until the pad 35 is installed in the knuckle 33, then the through shaft 39 just has to be inserted, preferably using the bushes 43, 45, with such shaft specifically going through the bore 350 located in the pylon 13

When so mounted, the through shaft 39 extends transversally to the axis X.

When mounted, the bores 37 are oriented horizontally, parallel to the axis X. And the pad 35 integral with the pylon 13 is oriented vertically, thus extending through a passage 47 of the knuckle 33.

Notably to hold the beam 31, if at least one of the suspension lugs 31a, 31b and/or the through shaft 39 fails, the lower end 35a of the pad 35 may be provided with a locking head 49 intended to hold the turbine engine in suspension, here via primary flow casing(s) assembly 9.

For an easy production, mounting, maintenance and efficiency, the locking head 49 may comprise a threaded part 49a located at said lower end of the pad 35 and a nut 49b screwed on the threaded part.

When mounting the turbine engine 1 to suspend it to the pylon 13 via the beam 31, the turbine engine is so raised that the pad 35 integral with the pylon is inserted into the passage 47 of the knuckle 33. The turbine engine 1, and more particularly the beam 31 which, in the example, is integral with one casing 9 of the turbine engine, remains articulated relative to the pylon 13 rigidly attached to the aircraft structure, so long as the through shaft 39 has not been installed. This makes it possible to adjust the positioning of the turbine engine using lifting means, so that the axis Y1 of the lugs 31a, 31b of the yoke joint 31 is correctly aligned with the axis of the bore 350 of the pad 35 to install the through shaft 39.

To enable such relative articulation of the beam 31 with respect to the pylon 13 during the mounting, thanks to the knuckle 33, a vertical clearance Ja is provided between an external body 33b of the knuckle, in the upper part thereof, as can be seen in FIG. 3, and either the pylon (if the pylon 13 and the pad 35 are formed in one piece) or, towards the pylon, a shoulder 35*a* which the pad is provided with, in the example, at the junction thereof with its lower part having a smaller diameter.

The locking head 49 may be installed on the pad 35 once the through shaft 39 has been installed. In operation, to prevent the locking head 49 from being stressed by the external body 33*b* of the knuckle 33, a vertical clearance Jb will preferably be provided between the locking head 49 and the lower part of the external body 33*b* as can be seen in FIG. 3. Such clearance Jb is cancelled in case of failure of the shaft-yoke joint assembly, i.e. in case of failure of the suspension lugs 31*a*, 31*b* and/or the shaft 39. As a matter of fact, as the beam 31 is then no longer suspended by such assembly, the weight of the engine makes it fall, on a small travel corresponding to the clearance Jb, until the beam is held by the locking head 49. The external body 33*b* of the knuckle then rests on the locking head 49 and is supported by the pad 35 via same. Such safety system provides a safe holding in suspension of the turbine engine in a so-called degraded mode of operation, which enables the aircraft to fly on and to land. The certification requirements of the engine can thus be met. Of course, after such an operation in degraded mode, ground repair must be carried out before the aircraft can be normally operated again.

The passage of the through shaft 39 through the receiving bores may be delicate. This is the reason why the invention proposes that the bores 37 of the lugs 31*a*, 31*b* of the beam 31 should extend along the same axis Y1. To be axially locked upon completion of the installation, the through shaft 39 may have a rim or a shoulder 390 which shall rest against one of the first and second bushes 43, 45, here a shoulder 45*a* of the second bush 45. Once the shaft 39 has been installed and goes through the first and second bushes 43, 45 previously installed in the receiving bores, the holding in position of the shaft is conventionally secured, for instance by tightening a nut (not shown) installed at one threaded end of the shaft 39. In the example of FIG. 3, such nut rests against a shoulder 43*a* of the first bush 43 provided on the external side of the first lug 31*a*, i.e. outside the U-shaped yoke.

In order to avoid a bending of the lugs 31*a*,31*b* when tightening the nut holding the shaft 39, the first and second bushes 43,45 will preferably have shoulders 43*a*,45*a* respectively, having an axial clearance Jc relative to axially external surfaces, respectively 310*a*, 310*b*, of the first and second lugs 31*a*,31*b* opposite which said shoulders are respectively positioned, as schematically illustrated in FIG. 3. The lugs 31*a*, 31*b* of the yoke are thus not axially stressed by the bushes 43, 45. The lugs 31*a*, 31*b* of the yoke thus only receive radial stresses relative to the axis Y1 of their bores 37.

As regards the intrinsic security and the fail-safe certification connected thereto, it has been explained above that, in order to preserve the suspension in case of failure of the shaft or of the yoke and, rather than totally or partially double up the device, the beam 31 can be held along the vertical axis of the pad 35 by the locking head 49. In order to provide a completely safe degraded mode of operation, the pylon 13 must be able to also receive the stress from the engine in a horizontal plane, i.e. in directions perpendicular to the vertical axis of the pad 35. For this purpose, the invention also proposes that the assembly above should further comprise, as shown in FIGS. 5, 6, a finger 51 integral with the pylon 13 at a distance from the pad 35 as well as a device integral with the beam 31 and able to cooperate with the finger 51 for the fail-safe function.

The finger 51 and the pad 35 extend parallel to each other, and thus perpendicularly to the axes X, Y1.

The finger 51 is also positioned at a distance from the lugs 31*a*, 31*b* and from the shaft 39 provided together to connect the beam 31 to the pylon 13.

To cooperate with the finger 51, the top of the beam 31 is provided with a bracket 31*c* extending horizontally, i.e. perpendicularly to the vertical axis of the pad 35, and comprising an orifice 53, wherein the finger 51 is adapted to engage with a clearance intended to be totally cancelled in a fail-safe situation. The bracket 31*c* is integral with the beam 31 and extends under the pylon 13 in a direction parallel to the axis X. The orifice 53 is here oblong in the direction parallel to the axis X, i.e. in the direction of the thrust of the engine, so as to create, in this direction, a sufficient fail-safe clearance relative to the finger 51 which has a circular section here. In normal operation, due to the effect of the engine thrust transmitted to the beam 31, and due to the effect of heat elongation which may affect the beam, the bracket 31*c* may slightly move axially relative to the pylon 13, which causes an axial displacement relative to the oblong orifice 53 relative to the finger 51 without however totally cancelling the fail-safe clearance.

Among the advantages of the above solution, it can be seen in FIG. 4 that the (each) pylon 13 may have a limited width, of less than 250 mm, or even less, with the width being the horizontal distance (perpendicularly to the axis X and parallel to the axis Y1) of the pylon 13 considered, at said through shaft 39.

This will provide a gain in drag of the assembly, thanks to the reduction in the width of the brackets and pylons.

Globally, the present solution provides a fail-safe solution. Besides, the suspension device is less cumbersome, as regards height, as compared to that mentioned in FR2965796A1. As a matter of fact, the height (up to the pylon) of the beam assembly substantially corresponds only to the height of the hoops, here 31*d*1, 31*d*2, the beam consists of, which is advantageous as regards the aerodynamic drag of the assembly. Besides, the mounting is particularly adapted to the suspension of a turbine engine to a pylon 13 with a small width, for instance a width of less than 250 mm. The aerodynamic drag caused by the pylon 13 in the secondary flow jet is thus limited too, relative to conventional solutions where the pylon is wider. The propulsion system obtained thus generates a substantially reduced aerodynamic drag relative to the solutions of the state of the art.

The invention claimed is:

1. A suspended set of an aircraft, the suspended set comprising:
   an aircraft structural pylon adjacent to a pad and having a first bore;
   a turbine engine; and
   an assembly between the aircraft structural pylon and the turbine engine, with the assembly comprising a beam attached to the turbine engine and wherein a knuckle for receiving the pad is mounted, with the beam comprising suspension lugs, each of the suspension lugs including a second bore for the passage of a shaft which further passes through the first bore to connect the beam with the aircraft structural pylon, wherein the knuckle is disposed at a distance from the shaft so that the shaft does not pass through the knuckle.

2. The suspended set of claim 1, wherein the knuckle comprises a C-clamp mounted to rotate in an external body of the knuckle integral with the beam, with said C-clamp providing a passage intended to be gone through by the pad.

3. The suspended set of claim 2, wherein the pad is oriented vertically, goes through a lower opening of the external body of the knuckle, and has a lower end provided with a locking head intended to cooperate with said external body of the knuckle in case of failure of at least one of the suspension lugs and the shaft, to provide the holding in suspension of the turbine engine in a degraded mode of operation, the external body of the knuckle then coming into contact with the locking head and supported by the pad via said locking head.

4. The suspended set of claim 3, wherein the locking head provided by the pad comprises a threaded part at said lower end of the pad and a nut screwed about the threaded part, with said nut being adapted to support the external body of the knuckle in the degraded mode of operation.

5. The suspended set of claim 2, wherein the external body of the knuckle is integral with the suspension lugs.

6. The suspended set of claim 1, wherein clearance is provided between an external body of the knuckle and at least one of the aircraft structural pylon and, towards the aircraft structural pylon, a shoulder provided on the pad, to create a ball effect.

7. The suspended set of claim 1, wherein:
the second bore in each of the suspension lugs extends along an axis, and
first and second bushes are respectively mounted in the respective second bore of each of the suspension lugs, about said shaft and have shoulders with an axial clearance relative to outer surfaces of the suspension lugs opposite which said shoulders are respectively positioned.

8. The suspended set of claim 1, further comprising a finger integral with the aircraft structural pylon, at a distance from said pad and extending in a direction parallel to that of the pad, with said beam having an oblong orifice extending in a direction extending through the finger and the pad, and wherein the finger is adapted to be engaged with a clearance in said direction.

9. The suspended set of claim 1, wherein the turbine engine is a multi-flow turbojet engine of an aircraft, with the multi-flow turbojet engine comprising:
in a front portion of the multi-flow turbojet engine, an engine fan having a fan casing; and
a gas generator accommodated inside an assembly of at least one casing and comprising, behind the engine fan, compression stages, a combustion chamber area, and turbine stages,
wherein the suspended set comprises a front hooking system interposed between the fan casing and a structure of the aircraft, and a rear hooking system interposed between a rear part of the assembly of at least one casing and the structural pylon of the aircraft, and
wherein the rear hooking system comprises the aircraft structural pylon.

10. The suspended set of claim 1, wherein the turbine engine is a multi-flow turbojet engine, with the multi-flow turbojet engine comprising:
in a front portion of the multi-flow turbojet engine, an engine fan having a fan casing; and
a gas generator accommodated inside an assembly of at least one casing and comprising, behind the engine fan, compression stages, a combustion chamber area, and turbine stages,
wherein the suspended set comprises a front hooking system interposed between a front part of the assembly of at least one casing and the structural pylon of the aircraft, and a rear hooking system interposed between a rear part of the assembly of at least one casing and said structural pylon of the aircraft, and
wherein the front hooking system comprises the aircraft structural pylon.

11. The suspended set of claim 1, wherein:
the pad extends along an axis along which globally flows from upstream to downstream a flow of fluid to be circulated therein; and
the first bore through which passes the shaft is transverse to said axis.

12. The suspended set of claim 1, wherein the suspension lugs are integral with beam and extend on both sides of the aircraft structural pylon.

13. The suspended set of claim 1, wherein the knuckle comprises a ball joint.

14. The suspended set of claim 1, wherein the knuckle comprises a ball knuckle.

15. The suspended set of claim 1, wherein the knuckle is configured to provide a ball effect.

16. The suspended set of claim 1, wherein aircraft structural pylon is connected to the pad.

* * * * *